Figure 5:
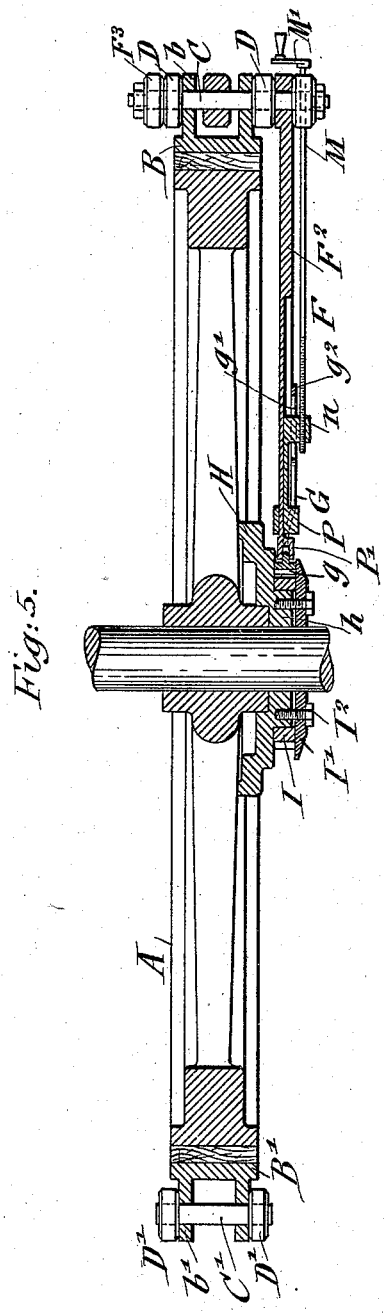

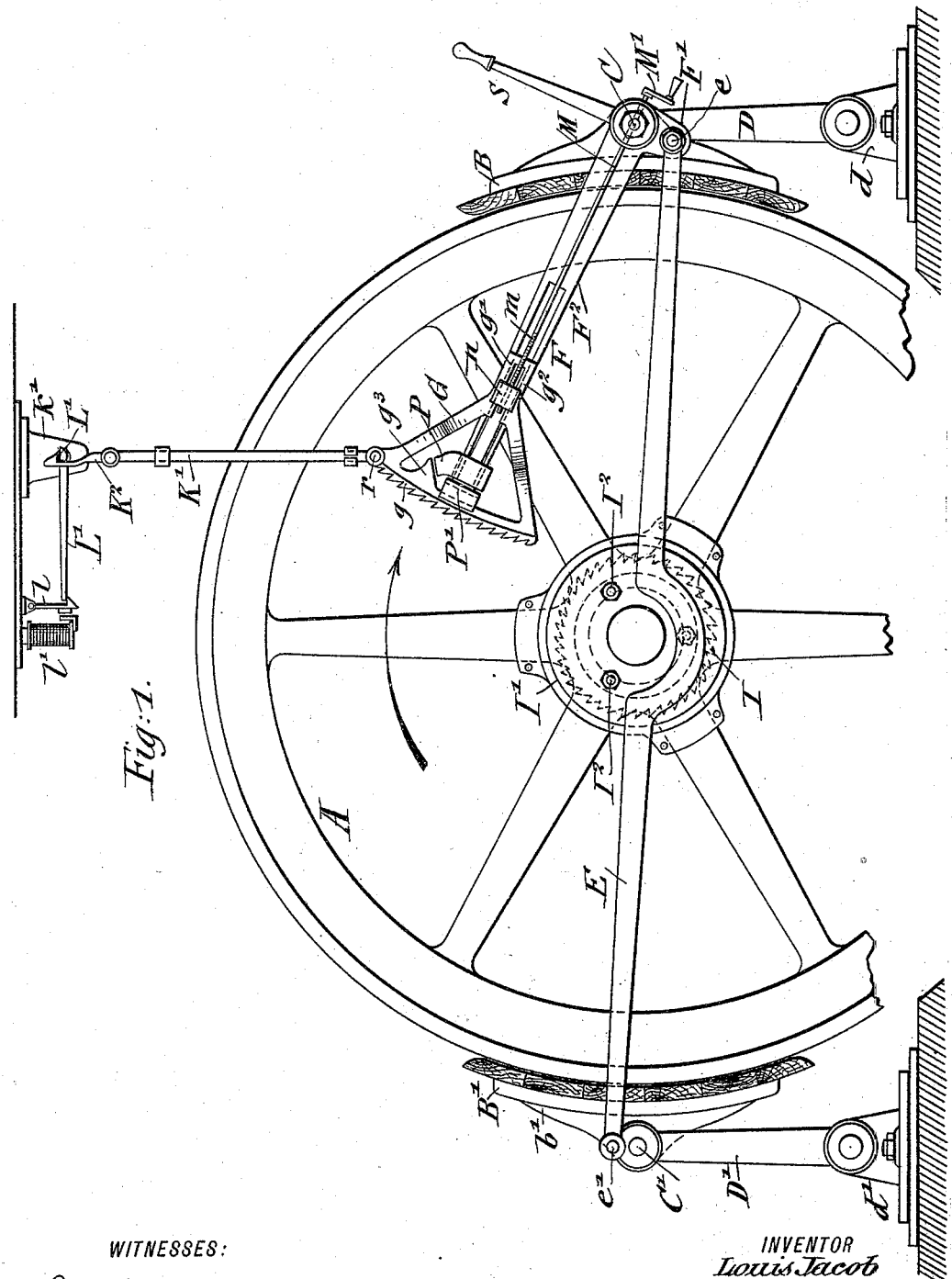

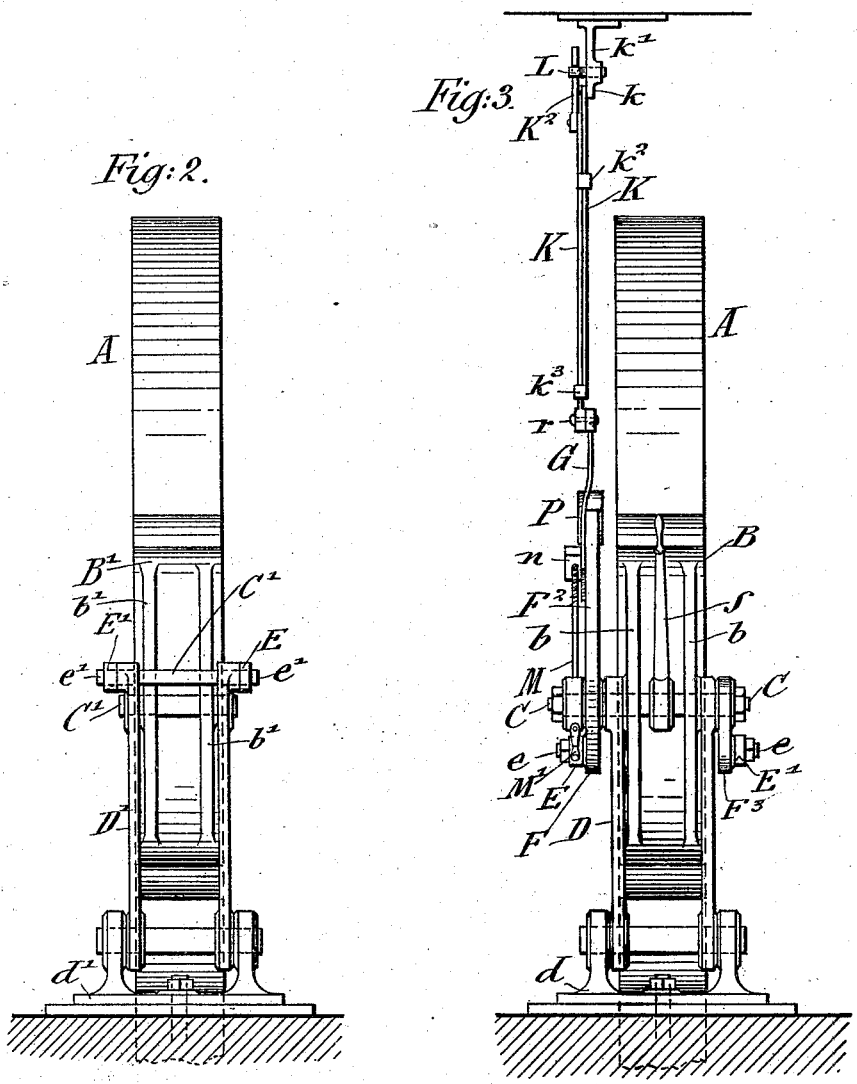

(No Model.) 3 Sheets—Sheet 3.
L. JACOB.
FLY WHEEL BRAKE.

No. 550,792. Patented Dec. 3, 1895.

WITNESSES INVENTOR
Louis Jacob
BY
ATTORNEYS.

UNITED STATES PATENT OFFICE.

LOUIS JACOB, OF CASSEL, GERMANY.

FLY-WHEEL BRAKE.

SPECIFICATION forming part of Letters Patent No. 550,792, dated December 3, 1895.

Application filed July 18, 1894. Serial No. 517,891. (No model.) Patented in Germany April 24, 1894, No. 78,435, and in Switzerland June 20, 1894, No. 8,670.

*To all whom it may concern:*

Be it known that I, LOUIS JACOB, a subject of the Emperor of Germany, and a resident of Cassel, Germany, have invented certain new and useful Improvements in Fly-Wheel Brakes, (for which I have obtained patents in Germany, No. 78,435, dated April 24, 1894, and in Switzerland, No. 8,670, dated June 20, 1894,) of which the following is a specification.

My invention relates to a brake apparatus for fly-wheels and the like of steam-engines, gas-motors, turbines, &c., by which in case of accidents or other interruptions in the proper working of the engine, motor, or turbine a brake may be set into action from a nearby or distant point in the factory, so that the fly-wheel is quickly stopped and the liability to loss of life or limb avoided.

My invention further relates to that class of brake apparatus in which a pair of brake-shoes are employed, the same being located at diametrically-opposite points of the fly-wheel, so that the braking action is applied to both sides of the wheel and the power equalized to prevent deleterious action upon the shaft of the wheel.

My invention consists of a braking apparatus for fly-wheels and the like, which comprises a pair of brake-shoes adapted to be applied at diametrically-opposite points of the fly-wheel, said brake-shoes being pivotally mounted upon oscillating supports; a bell-crank lever mounted on the pivot which connects one of the brake-shoes with its support, the short arm of said bell-crank lever being connected by means of a draw-rod with the opposite brake-shoe, and the long arm of the same being provided with a toothed segment which is adapted to engage a toothed friction-ring mounted on the hub or other rotating part of the fly-wheel; supporting-rods, and a suitable device adapted for detachable connection with the supporting-rods, so that by a suitable releasing device such connection may be broken and the toothed segment permitted to move into engagement with said toothed ring.

My invention consists, further, of an adjustable wedge located on the long arm of the bell-crank lever, said wedge being provided with devices for adjusting the same and being adapted to be engaged by said toothed segment, so that at the proper moment said segment is released from engagement with said toothed friction-ring and the brake-shoes removed from the periphery of the fly-wheel.

My invention also consists of the construction and combination of parts and details, as will be fully described hereinafter and finally pointed out in the claims.

In the accompanying drawings, Figure 1 is a side elevation of my improved fly-wheel brake, showing the same in connection with a fly-wheel. Fig. 2 is a rear elevation thereof, and Fig. 3 is a front elevation of the same. Fig. 4 is a detail view showing the main portion of the bell-crank lever and the toothed friction-ring which is engaged by the toothed segment which is carried by said lever; and Fig. 5 is a horizontal section, partly in elevation, on line 5 5 of Fig. 1.

Similar letters of reference indicate corresponding parts.

Referring to the drawings, A represents the fly-wheel of an engine or other motor, the direction of motion of which is indicated by the arrow, and B B' indicate a pair of brake-shoes applied, respectively, to the periphery of said fly-wheel at diametrically opposite points, and these brake-shoes may be constructed in any approved manner with suitable friction-faces. Lugs $b$ $b'$ on the rear sides of the brake-shoes receive pivot-pins C C', which are located at the upper ends of oscillating supports D D', which supports are pivoted at their lower ends upon bed-plates $d$ $d'$, arranged outside of the engine or machine, so that the strains produced during the application of the brake-shoes will be taken up by the foundation and not by the engine.

Pivoted eccentrically at each end to the brake-shoes is a pair of draw-rods E E', arranged, respectively, on opposite sides of the fly-wheel, the pivots of the same being indicated by $e$ $e'$, said pivot $e'$ passing through the lugs $b'$ of the brake-shoe B' and the pivot $e$ passing through the short arm F' of a bell-crank lever F. This bell-crank lever F is fulcrumed at its angle on the pivot C, by which the brake-shoe B and its oscillating support D are connected. For the purpose of rigidly connecting the bell-crank lever F with the pivot C the latter is preferably squared or grooved in an evident manner to receive a complementary socket in the lever, which is located at one side of the fly-wheel, while at the other end of the pivot is a short arm $F^3$, on which the draw-rod E' at that side of the fly-wheel is fulcrumed, said short arm $F^3$ being equal in length to the short arm F' of the bell-crank lever, so that equal pulls are exerted upon the draw-rods E E'.

At the outer end of the long arm $F^2$ of the bell-crank lever F is a toothed segment G, the teeth $g$ of which are arranged on a curve concentric with the pivot C of the bell-crank lever, and the segment is so disposed with relation to the hub or other rotating part H of the fly-wheel as that the teeth thereof may be brought into engagement with the teeth of a toothed friction-ring I, which is received upon circular boss $h$ of said hub portion H. A clamping-disk I' is arranged alongside of the friction-ring I and is provided with suitable holes for receiving screws $I^2$, which engage in the hub portion H, so that a greater or less degree of friction may be imparted to the friction-ring I. The bell-crank lever and its toothed segment are held in raised position, with the teeth of the segment disengaged from the teeth of the friction-ring, by means of a rod K, suspended by a pivot $k$ on a ceiling-hanger $k'$, and by means of a second rod $K^2$, pivoted to the segment at $r$, and which, by means of a sleeve $k^2$ on the same and a second sleeve $k^3$ on the rod K, is permitted to slide at the proper moment, said rod K' being held up by means of a hook $K^2$, which is pivoted to its upper end and which is adapted to engage an eccentrically-formed pivot L, which is journaled in the said hanger $k'$. Extending from this pivot is a rock-arm L', which is adapted to be engaged at its free end by means of the hook of a pivoted contact $l$ of an electromagnet $l'$, both said electromagnet and its contact-piece being supported in any suitable manner from the ceiling.

In operation when the electromagnet is energized for the purpose of avoiding an accident or for braking the fly-wheel for any other purpose the contact-piece $l$ is drawn toward the electromagnet and the oscillating arm L' is released, so that the hook $K^2$ at the upper end of the slide-rod K' is disengaged from the eccentrically-formed pivot L, and the slide-rod, bell-crank lever, and segment-rack lowered. The toothed segment having been so adjusted on the bell-crank lever that the distance between the teeth of the segment and the pivot C is the same as the distance between the teeth of the friction-ring I and the same pivot when the main brake-shoes are applied, the lowering of the long arm of the bell-crank lever causes the teeth $g$ of the segment G to engage with the teeth of the friction-ring I, which is held at a greater or less degree of tension, as desired, by means of the clamping-disk I'. The brake-shoes will be now instantly applied at diametrically-opposite points of the fly-wheel by means of the short arms F' $F^3$ at the angle of the bell-crank lever and the draw-rods E E', which connect said short arms with the brake-shoe at the other ends of said draw-rods, thereby uniformly applying the brake-shoes to the fly-wheel at said diametrically-opposite points. Passing through the pivot C and, applied thereto so as not to be permitted longitudinal movement, is a journaled rod M, provided with a hand-crank M' at one end and with screw-threads $m$ at the other end, said rod extending along the long arm of the bell-crank lever and engaging at its threaded end in an internally-threaded lug $n$, which passes through an opening $g'$ in the shank $g^2$ of said toothed segment, that is guided along the grooved side of said long arm. Said lug $n$ is suitably connected with a wedge P, which is arranged at the outer end of the arm $F^2$ of the bell-crank lever, so that when the rod M is turned in one direction said wedge P is pressed against a beveled shoulder $g^3$, which is formed upon the toothed segment at the rear of its teeth $g$, and the toothed segment is moved outward. In order that the wedge P cannot push the toothed segment too far outward, a stop P' is formed on the end of the long arm of the bell-crank lever, against which the wedge abuts when the teeth of the segment are in such relative position to the teeth of the friction-ring that when the contact-piece is actuated and the bell-crank lever lowered the respective series of teeth will be brought into effective engagement. This wedge P, when it is adjusted outwardly on the bell-crank lever, receives and takes up the pressure of the toothed segment G when the teeth thereof have been engaged by the teeth of the toothed ring I in applying the brake. When the brake-shoes are to be withdrawn, the threaded rod M is turned so as to bring its lug $n$ against the closed inner end of the opening $g'$, thus retracting the wedge and drawing the segment inwardly, removing the teeth thereof from the teeth of the friction-ring. By means of the hand-lever S the long arm of the bell-crank lever F is again raised, together with the slide-rod K', which are then held in raised position by means of the hook $K^2$, which is caused to again engage with the eccentrically-formed pivot L, and the braking apparatus is then ready, when the oscillating arm L' is engaged with the contact-pieces $l$ and after the toothed segment has been adjusted outwardly, to be set in action to effect another stoppage of the fly-wheel.

Having thus described my invention, I claim as new and desire to secure by Letters Patent—

1. The combination, with a pair of brake-shoes and oscillating supports upon which the same are fulcrumed, of a bell-crank lever pivoted to one of said brake-shoes at its angle, a draw-rod pivotally connecting the short arm of the bell-crank lever eccentrically with the opposite brake-shoe, toothed devices respectively on the long arm of the bell-crank lever, and on the rotating part of a fly-wheel, mechanism for holding the long arm of the bell-crank lever with its toothed device above the toothed devices on said wheel, and a detachable connection located in said mechanism whereby said toothed devices are permitted to be brought into engagement, whereby the brake-shoes are applied, substantially as set forth.

2. The combination, with a wheel having a hub-portion, a toothed friction-ring adapted to turn on said hub-portion, and means for imparting to the friction-ring the required degree of friction, of a pair of brake-shoes arranged at diametrically opposite points of said wheel, oscillating supports on which the brake-shoes are fulcrumed, a bell-crank lever which is fixed at its angle to the pivot connecting one of said brake-shoes with its oscillating support, a draw-rod pivotally connecting the short arm of the bell-crank lever eccentrically with the other brake-shoe, a toothed segment arranged on the long arm of the bell-crank lever and adapted to engage said toothed friction-ring, mechanism for holding the toothed segment out of engagement with the toothed friction-ring, and a detachable connection located in said mechanism, whereby when the connection is broken said toothed segment is placed in engagement with the toothed friction-ring, and the brake-shoes applied, substantially as set forth.

3. The combination with a wheel provided with a hub-portion, a toothed friction-ring adapted to turn on said hub-portion, and a clamping-disk arranged alongside of said friction-ring and adapted to impart a greater or less degree of friction to the same, of a pair of brake-shoes arranged at diametrically opposite points of said wheel, movable supports on which the brake-shoes are fulcrumed, a bell-crank lever pivotally connected at its angle with one of the brake-shoes, a draw-rod pivotally connecting the short arm of the bell-crank lever eccentrically with the opposite brake-shoe, a toothed segment arranged on the long arm of the bell-crank lever, mechanism for holding the toothed segment out of engagement with said toothed friction-ring, and a detachable connection located in said mechanism whereby when the connection is broken said toothed segment is brought into engagement with said toothed friction-ring, and the brake-shoes applied, substantially as set forth.

4. The combination with a wheel provided with a hub-portion, a toothed friction-ring mounted to turn on said hub-portion, and means for imparting to said ring a greater or less degree of friction, of a pair of brake-shoes arranged at diametrically opposite points of said wheel, movable supports on which the brake-shoes are fulcrumed, a bell-crank lever secured at its angle to the pivot which connects one brake-shoe with its support, a draw-rod pivotally connecting the short arm of the bell-crank lever eccentrically with the brake-shoe, a toothed segment arranged on the long arm of the bell-crank lever, an electro-magnet provided with a hooked pivoted contact, and mechanism adapted to be engaged with said hooked contact whereby the toothed segment may be held out of engagement with the toothed friction-ring, said mechanism being provided with a detachable connection, whereby when the same is broken by the energizing of the electro-magnet, said toothed segment is lowered into engagement with said toothed friction-ring and the brake-shoes applied, substantially as set forth.

5. The combination, with a wheel provided with a hub-portion, a toothed friction-ring adapted to turn on said hub-portion, and means for imparting a greater or less degree of friction to the friction-ring, of a pair of brake-shoes applied at diametrically opposite points of said wheel, movable supports on which the brake-shoes are fulcrumed, a bell-crank lever mounted at its angle on the pivot connecting one of the brake-shoes with its support, a draw-rod pivotally connecting the short arm of the bell-crank lever eccentrically with the other brake-shoe, a toothed segment arranged on the long arm of the bell-crank lever, a pair of rods pivotally supported from above, one of which is adapted to slide upon the other and is pivotally connected with said toothed segment, an oscillating arm with which said sliding-rod is adapted to be detachably connected, means for holding said oscillating arm in raised position whereby the toothed segment is upheld, and means for disengaging said oscillating arm and said sliding-rod, whereby the toothed segment is permitted to be lowered into engagement with said friction-ring and the brake-shoes applied, substantially as set forth.

6. The combination with a wheel provided with a hub-portion, a toothed friction-ring adapted to turn on said hub-portion, and means for holding the friction-ring in position, of a pair of brake-shoes applied at diametrically opposite points of said wheel, movable supports on which the brake-shoes are fulcrumed, a bell-crank lever fulcrumed on the pivot connecting one of the brake-shoes with its support, a draw-rod pivotally connecting the short arm of the bell-crank lever eccentrically with the other brake-shoe, a sliding toothed segment arranged on the long arm of the bell-crank lever and adapted to engage said toothed friction-ring, mechanism for holding the toothed segment out of engagement with the toothed friction-ring, mechanism for releasing the toothed segment from said holding mechanism, and means for disengaging the toothed segment from the toothed friction-ring, substantially as set forth.

In testimony that I claim the foregoing as my invention I have signed my name in presence of two subscribing witnesses.

LOUIS JACOB.

Witnesses:
FRANZ HASSLACHER,
MICHAEL VOLK.